(12) United States Patent
Nagle et al.

(10) Patent No.: US 9,429,024 B2
(45) Date of Patent: Aug. 30, 2016

(54) PROPELLER BLADE WITH LIGHTWEIGHT INSERT

(71) Applicants: David P. Nagle, Westfield, MA (US); Paul Carvalho, Westfield, MA (US); Bruno Seminal, Lot (FR); Stephane Grimal, Figaec (FR)

(72) Inventors: David P. Nagle, Westfield, MA (US); Paul Carvalho, Westfield, MA (US); Bruno Seminal, Lot (FR); Stephane Grimal, Figaec (FR)

(73) Assignees: HAMILTON SUNDSTRAND CORPORATION, Windsor Locks, CT (US); RATIER-FIGEAC SAS, Figeac (FR)

( * ) Notice: Subject to any disclaimer, the term of this patent is extended or adjusted under 35 U.S.C. 154(b) by 835 days.

(21) Appl. No.: 13/690,033

(22) Filed: Nov. 30, 2012

(65) Prior Publication Data

US 2013/0136615 A1 May 30, 2013

(30) Foreign Application Priority Data

Nov. 30, 2011 (EP) .................................. 11306587

(51) Int. Cl.
*B64C 11/26* (2006.01)
*F01D 5/14* (2006.01)
*B29D 99/00* (2010.01)
(52) U.S. Cl.
CPC ........... *F01D 5/147* (2013.01); *B29D 99/0025* (2013.01); *B64C 11/26* (2013.01)

(58) Field of Classification Search
CPC ...... F01D 5/147; B64C 11/20; B64C 11/205; B64C 11/22; B64C 11/26; B64C 11/16; B64C 11/00
USPC ........................................................ 416/226
See application file for complete search history.

(56) References Cited

U.S. PATENT DOCUMENTS

| | | | | |
|---|---|---|---|---|
| 3,606,580 A | * | 9/1971 | Kaugman, Sr. ......... | B21H 7/16 416/232 |
| 4,298,417 A | | 11/1981 | Euler et al. | |
| 4,302,155 A | * | 11/1981 | Grimes ................... | B64C 11/26 416/144 |
| 4,471,020 A | * | 9/1984 | McCarthy ............. | B29C 44/145 156/245 |
| 4,648,921 A | * | 3/1987 | Nutter, Jr. ............... | B29C 70/08 156/242 |
| 4,806,077 A | * | 2/1989 | Bost ...................... | B64C 27/473 416/144 |
| 5,127,802 A | * | 7/1992 | Carlson ................... | B29C 44/18 29/889.71 |
| 2012/0321479 A1 | * | 12/2012 | Bruun ................... | B29C 44/569 416/226 |

OTHER PUBLICATIONS

EP Search Report for Application No. 11306587.4-1254, mailed on Jun. 6, 2012, 6 pages.

* cited by examiner

*Primary Examiner* — Richard Edgar
(74) *Attorney, Agent, or Firm* — Cantor Colburn LLP

(57) ABSTRACT

A propeller blade includes a foam core and a structural layer that surrounds at least a portion of the foam core and includes a face side and a camber side is disclosed. The propeller blade also includes an insert disposed in the foam core in operable contact with the face side and the camber side of the structural layer.

15 Claims, 5 Drawing Sheets

PROPELLER BLADE WITH LIGHTWEIGHT INSERT

PRIORITY CLAIM

This application claims priority to European Patent Application No. 11306587.4, filed Nov. 30, 2011, and all the benefits accruing therefrom under 35 U.S.C. §119, the contents of which in its entirety are herein incorporated by reference.

BACKGROUND OF THE INVENTION

The present invention relates to propellers and, in particular, to propeller blades that include a lightweight insert disposed in them.

Modern propeller blades typically include root portions which extend into the hub arm of the hub of the propeller system and which are secured to and rotatable relative to the hub arm via a retention assembly. Typically the retention assembly includes one or a plurality of ball bearing assemblies which permit the rotation of the blade in the hub arm for accomplishing pitch change of the blade for altering the speed of the propeller and accordingly, the aircraft.

The blades are typically formed by surrounding a foam spar core with a resin impregnated fabric. Leading and trailing edges of the blade are then formed over the fabric and surrounded by, for example, a Kevlar sock. Such blades are light and effective for their intended purposes.

BRIEF DESCRIPTION OF THE INVENTION

According to one embodiment, a propeller blade that includes a foam core and a structural layer that surrounds at least a portion of the foam core and includes a face side and a camber side is disclosed. The propeller blade of this embodiment also includes an insert disposed in the foam core in operable contact with the face side and the camber side of the structural layer.

According to another embodiment, method of forming a propeller blade is disclosed. The method of this embodiment includes: providing a mold; disposing an insert in the mold; forming a foam core; and forming a structural layer that surround the foam core and includes a face side and a camber side such that the face side and the camber side are in operable contact with the insert.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
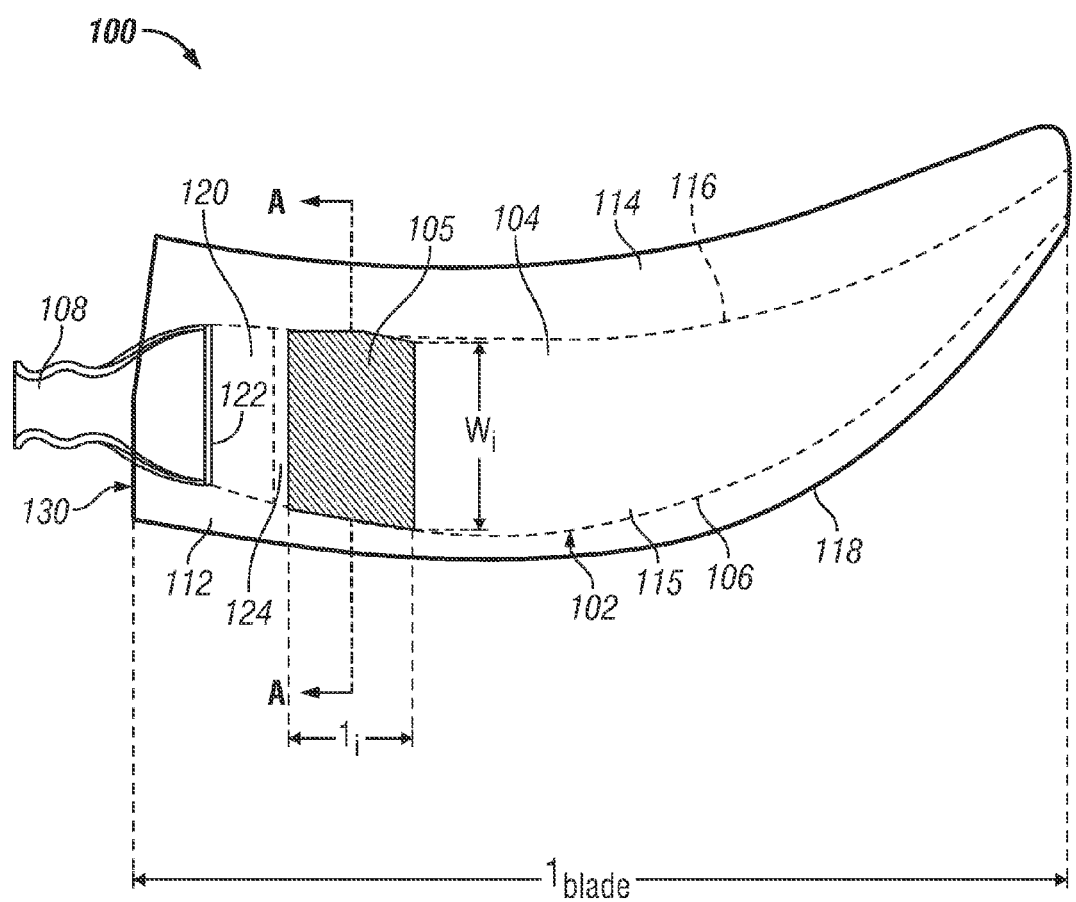
FIG. 1 is a plan-view of a propeller blade according to one embodiment of the present invention.
Figure 2:
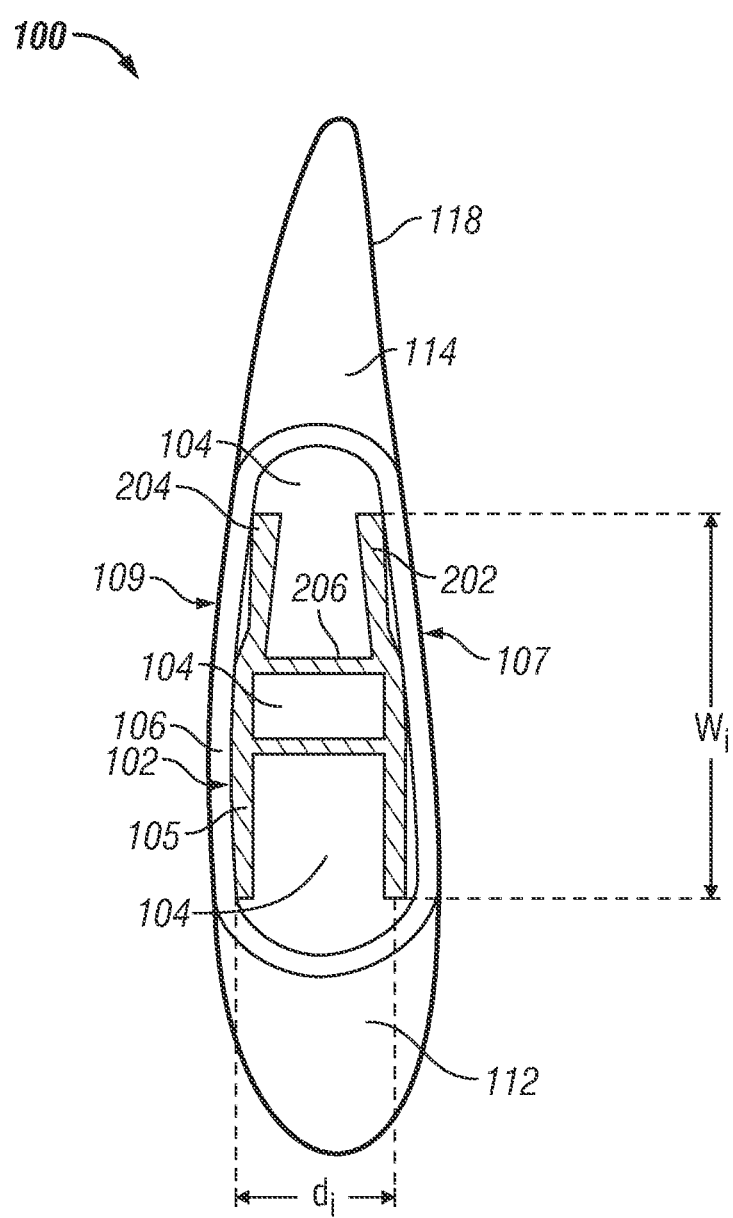
FIG. 2 is a cross-section of the propeller blade shown in FIG. 1.

Referring now to FIG. 1, a plan view of a propeller blade 100 according to one embodiment of the present invention is illustrated. Reference will also be made to FIG. 2, which is a cross-section of the propeller blade 100 of FIG. 1 taken along line A-A.

The blade 100 is formed by first forming a spar 102. The spar 102 includes a spar foam core 104 surrounded by a structural layer 106. The core 104 is typically formed of a foam material that is injected into a mold but could also be pre-molded and machined and then inserted into the mold. The mold can include a layer of fiberglass or carbon on the walls thereof to which the foam of the core 104 adheres. As such, the core 104 can be surrounded by a layer of fiberglass or carbon (not shown) in one embodiment but this is not required. The foam that forms the core 104 can be selected from one of: polyurethane (PU), polyisocyanurate, or polymethacrylimide (PMI).

According to one embodiment, an insert 105 can be provided in the mold. In such an embodiment, the foam of the core 104 is disposed within open spaces defined by the insert 105. The foam of the core 104 is also disposed in the remainder of the area of the mold not occupied by the insert 105. The insert 105 can be formed of carbon, fiberglass or any other suitable composite or non-composite material.

The structural layer 106 is typically formed of a fabric material (e.g. a braided carbon material) and disposed such that it surrounds the core 104 (and the fiberglass or carbon layer if it is included). In one embodiment, the structural layer 106 is impregnated with a resin. In some cases, the spar 102 is heated to set the resin in the structural layer 106. It has been discovered that, in some instances, additional structure is required to transfer shear force from the face 107 and camber 109 sides of the blade 100 to prevent foam core 104 cracking. With the inclusion of the insert 105, the face 107 and camber 109 sides (FIG. 2) of the spar 102 in general (and the corresponding face and camber sides of the structural layer 106, in particular) are kept in a fixed relation to one another. As such, the possibility of the core 104 cracking may be reduced.

In some instances, the spar 102 is formed such that a portion of it surrounds a root portion 108 that allows the blade 100 to be connected to a hub (not shown). Rotation of the hub causes the blade 100 to rotate and, consequently, causes the generation of thrust to propel an aircraft. In the following discussion, it shall be assumed that the blade 100 rotates in the clockwise direction. The root portion 108 is sometimes referred to as a "tulip" in the industry and is typically formed of a metal.

After the spar 102 is formed, leading edge foam 112 and trailing edge foam 114 are formed on the leading and trailing edges 115, 116 respectively of the spar 102. The leading edge foam 112, trailing edge foam 114 and the spar 102 can then be encased in an outer layer 118. The outer layer 118 can be formed of Kevlar and be in the form of a sock that is pulled over the assembly that includes the leading edge foam 112, trailing edge foam 114 and the spar 102. Of course, the outer layer 118 could be formed in other manners as well.

In some instances, to reduce weight, balance the blade 100, or both, a section of the core 104 is removed. In FIG. 1, the section is illustrated by void 120. That is, within the structural layer 106, void 120 is formed between an end 122 of the root 108 and an end 124 of the core 104. The void 120 can also extend into the root 108 in one embodiment. The void 120 can be formed by removing portions of the core 104 through the root 108. The void 120 can be created before or after any of the leading edge foam 112, trailing edge foam 114 and the outer layer 118 are formed. Stated differently, the void 120 can be formed any time after the structural layer 106 is formed. In cases where the void 120 is present, the end 124 of the core 104 may extend from an edge of the insert 105 towards the root 108. The distance the core 104 extends beyond the insert 105 in the direction of the root will vary depending on the context.

The insert 105 can take on any number of shapes and, as illustrated in FIGS. 1 and 2 can have a length $l_i$, a width $w_i$, and a depth $d_i$. It shall be understood that depending on the shape and location along length the blade 100, the values $w_i$, and $d_i$ will generally vary to conform them to the desired shape of the blade 100. In one embodiment, the length $l_i$ spans a portion of the length of the blade 100 that is within the first half of the length $l_{blade}$ of blade 100 measured from the end 130 of the blade 100 where the root 108 is located. Of course, the length $l_i$ of the insert 105 can be any length that is less than the length $l_{blade}$ of the blade 100.

In one embodiment, and as best illustrated in FIG. 2, the insert includes a face component 202 and a camber component 204 that generally define the width $w_i$ of the insert 105 on the face and camber sides 107, 109 of the blade 100. As illustrated, the face component 202 and the camber component 204 are connected by two cross members 206. Of course, the number of cross members could be varied. As such, the insert 105 can include one or more cross members 206 that connect the face component 202 and the camber component 204. In one embodiment, and as illustrated, the face component 202 and the camber component 204 extend beyond the cross members 206 towards both the leading edge foam 112 and the trailing edge foam 114. Of course, either or both the face component 202 and the camber component 204 could extend beyond the cross members 206 towards only one of the leading edge foam 112 and the trailing edge foam 114 or not at all.

FIGS. 3A-3E illustrate side views of different embodiments of inserts 105 that could be utilized in accordance with the teachings herein. All of the inserts 105 shown in FIGS. 3A-3E include a face component 202 and the camber component 204 and could be disposed in the blade 100 as illustrated in FIGS. 1 and 2 such that the face component 202 contacts the face side 107 of the structural layer 106 and the camber component 204 contacts the camber side 109 of the structural layer 106. The names given the inserts 105 described below may be understood if they are rotated 90 degrees but they are shown in the particular manner to maintain consistency with FIG. 2.

Figure 3A:
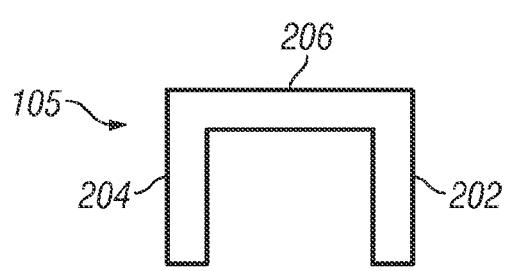
FIGS. 3A-3E are side views that illustrate different configurations of an insert that can be provided within the propeller blade shown in FIGS. 1 and 2.
Figure 4:
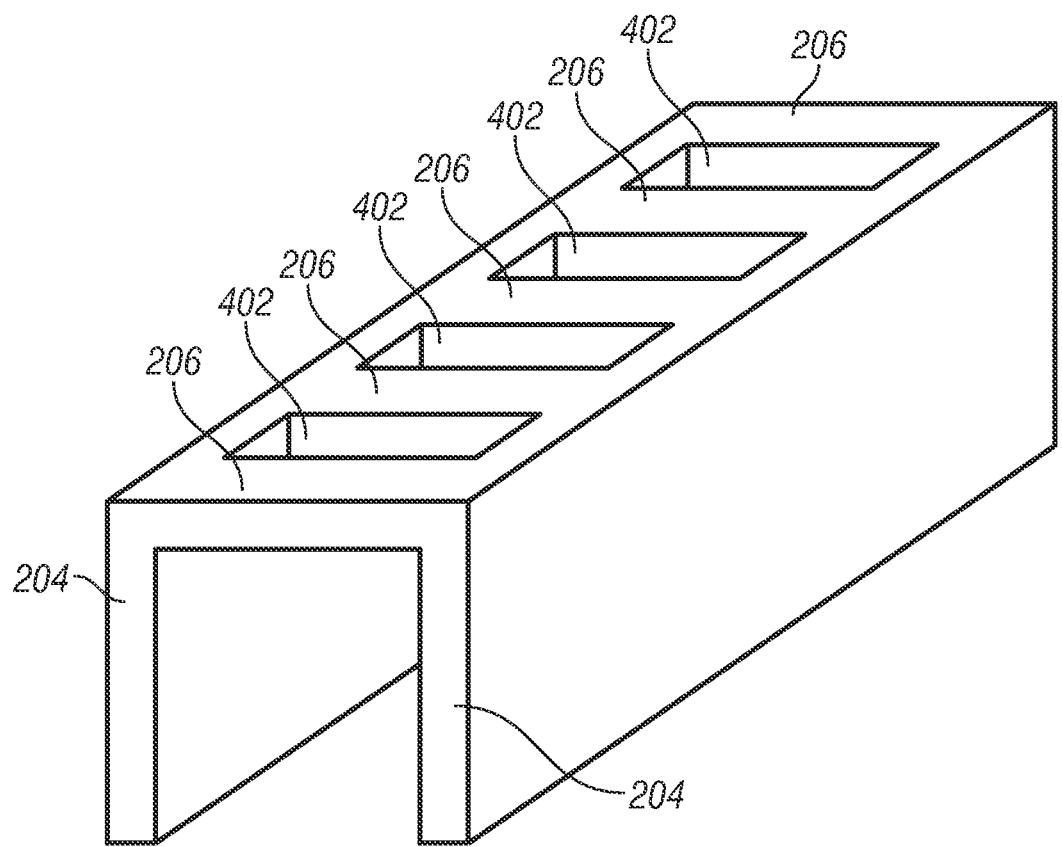
FIG. 4 is a perspective view of one embodiment of an insert according to the present invention.

In more detail, FIG. 3A illustrates a c-shaped insert 105 that includes a cross member 206 connecting ends of the face component 202 and the camber component 204. It shall be understood that the cross member 206 of FIG. 3A (as well as any other cross member 206 in any other figure) could be formed as a plurality of substantially co-planar cross-members 206 separated by spaces 402 as is illustrated in FIG. 4.

Figure 3B:
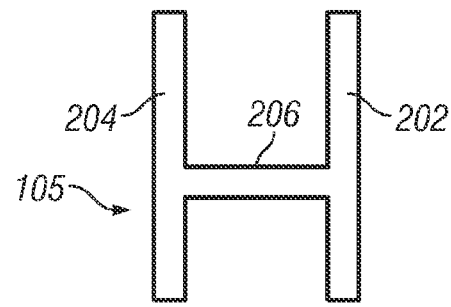

FIG. 3B illustrates an I-shaped insert 105 that includes a cross member 206 that connects the face component 202 and the camber component 204 at a location that is not at the end of either. As illustrated, the cross member 206 is perpendicular to both the face component 202 and the camber component 204. As one of ordinary skill will readily understand, the cross member 206 could be disposed at other angles relative to one or both of the face component 202 and the camber component 204.

Figure 3C:
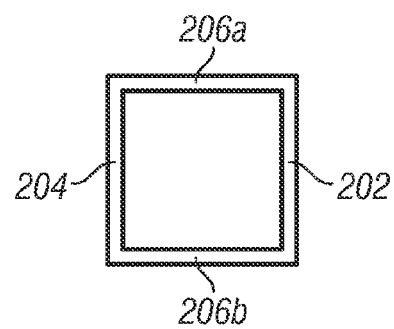

FIG. 3C illustrates a box-shaped insert 105 that includes two cross members 206a and 206b that connect respective ends of the face component 202 and the camber component 204. The insert 105 illustrated in FIG. 3C is similar to that shown in FIG. 2 except that the face component 202 and the camber component 204 do not extend beyond the cross members 206.

Figure 3D:
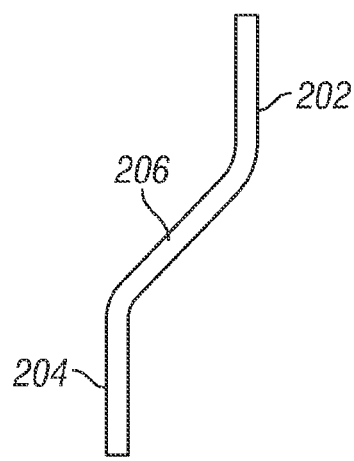

FIG. 3D illustrates a z-shaped insert 105 that includes a cross member 206 that connects opposite ends of the face component 202 and the camber component 204 together.

Figure 3E:
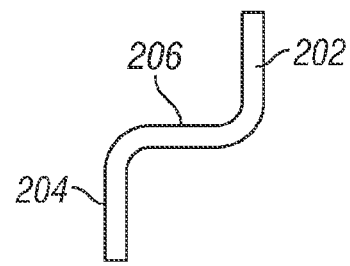

FIG. 3E illustrates an s-shaped insert 105 that includes a curved cross member 206 that connects opposite ends of the face component 202 and the camber component 204 together. It shall be understood that one or both of the face component 202 and the camber component 204 could also be curved.

Figure 5:
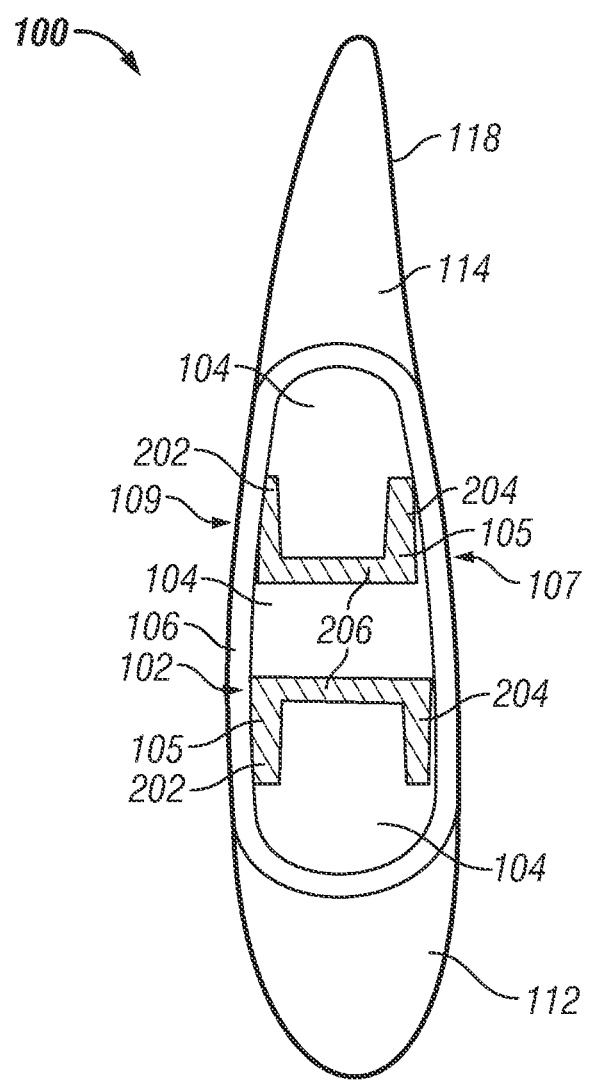
FIG. 5 is a cross-section of a propeller blade that includes two separate inserts in accordance with one embodiment of the present invention.

In one embodiment, multiple inserts 105 could be provided within a single blade 100. For example, and with reference to FIG. 5, two c-shaped inserts 105 (FIG. 3A) oriented in opposing directions and disposed within blade 100. As illustrated, the inserts 105 have lengths that cross a single vertical plane. Of course, the inserts 105 could be offset from one another such that no vertical cross section intersects the length of the both inserts (assuming the blade is oriented as shown in FIG. 1).

As discussed above, the inserts 105 disclosed herein can reduce the possibility of the spar core 104 from cracking. In addition, when loads are applied to the blade (e.g., during flight) the inserts 105 disclosed herein can have the effect of preventing one or both of the face side 107 and the camber side 109 bulging outward, reducing the stresses in the blade spar.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A propeller blade comprising:
    a foam core;
    a structural layer that surrounds at least a portion of the foam core and includes a face side and a camber side;
    an insert disposed in the foam core in operable contact with the face side and the camber side of the structural layer;
    a root disposed within the structural layer at an end of the propeller blade, wherein a void exists between an end of the root and an end of the foam core.

2. The propeller blade of claim 1, wherein the insert includes a face component and a camber component connected by a connecting member.

3. The propeller blade of claim 2, wherein the insert further includes another connecting member that connects the face component and the camber component and is separate from the connecting member.

4. The propeller blade of claim 2, wherein the connecting member is located at ends of one or both of the face component and the camber component.

5. The propeller blade of claim 2, wherein the connecting member is located at a location that is not at an end of one or both of the face component and the camber component.

6. The propeller blade of claim 2, wherein the connecting member is substantially perpendicular to the one or both of the face component and the camber component.

7. The propeller blade of claim 1, wherein the end of the foam core is closer than an end of the insert to the end of the root.

8. The propeller blade of claim 1, wherein the foam core is formed of one or more of: polyurethane (PU), polyisocyanurate, and polymethacrylimide (PMI).

9. The propeller blade of claim 1, wherein the structural layer is formed of a resin-impregnated fiber material.

10. The propeller blade of claim 1, wherein the insert is formed of one of: fiberglass, carbon, or a combination thereof.

11. The propeller blade of claim 1, wherein the insert is formed of a composite material.

12. A method of forming a propeller blade comprising:
providing a mold;
disposing an insert in the mold;
forming a foam core;
forming a structural layer that surround the foam core and includes a face side and a camber side such that the face side and the camber side are in operable contact with the insert;
coupling a root to the foam core;
wherein forming a structural layer includes disposing the structural layer over at least a portion of the root; and
removing a portion of the foam core between an end of the root and an end of the insert after the structural layer has been formed.

13. The method of claim 12, wherein the foam core is formed after the insert has been disposed in the mold.

14. The method of claim 13, wherein forming a foam core includes injecting foam into the mold.

15. The method of claim 12, wherein forming the foam core includes:
machining the foam core at a location outside of the mold; and
disposing the foam core in the mold.

\* \* \* \* \*